US008673996B2

(12) United States Patent
Lee et al.

(10) Patent No.: US 8,673,996 B2
(45) Date of Patent: Mar. 18, 2014

(54) UV CURABLE ANHYDRIDE-MODIFIED POLY(ISOBUTYLENE)

(75) Inventors: Hae-Seung Lee, Woodbury, MN (US); Joon Chatterjee, Bloomington, MN (US); Gregg A. Caldwell, Cottage Grove, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 13/280,519

(22) Filed: Oct. 25, 2011

(65) Prior Publication Data

US 2012/0123011 A1 May 17, 2012

Related U.S. Application Data

(60) Provisional application No. 61/414,046, filed on Nov. 16, 2010.

(51) Int. Cl.
*C08F 299/02* (2006.01)
*C08F 2/10* (2006.01)

(52) U.S. Cl.
USPC ............... 522/149; 522/33; 522/59; 522/62; 522/63; 522/65

(58) Field of Classification Search
USPC ........................ 522/33, 59, 62, 63, 65, 149
See application file for complete search history.

(56) References Cited

U.S. PATENT DOCUMENTS

| | | | |
|---|---|---|---|
| 2,803,615 | A | 8/1957 | Ahlbrecht et al. |
| 3,842,059 | A | 10/1974 | Milkovich et al. |
| 4,181,752 | A | 1/1980 | Martens et al. |
| 4,329,384 | A | 5/1982 | Vesley et al. |
| 4,378,250 | A | 3/1983 | Treadway et al. |
| 4,533,723 | A | 8/1985 | Weitemeyer |
| 4,619,979 | A | 10/1986 | Kotnour et al. |
| 4,732,808 | A | 3/1988 | Krampe et al. |
| 4,822,688 | A * | 4/1989 | Nogues ........................ 428/458 |
| 4,843,134 | A | 6/1989 | Kotnour et al. |
| 5,204,219 | A | 4/1993 | Van Ooij et al. |
| 5,459,174 | A | 10/1995 | Merrill et al. |
| 5,464,900 | A | 11/1995 | Stofko, Jr. et al. |
| 5,468,353 | A | 11/1995 | Anich et al. |
| 5,567,775 | A | 10/1996 | Wang et al. |
| 5,602,221 | A | 2/1997 | Bennett et al. |
| 5,639,546 | A | 6/1997 | Bikadi |
| 5,650,261 | A | 7/1997 | Winkle |
| 5,852,148 | A | 12/1998 | Behr et al. |
| 6,063,838 | A | 5/2000 | Patnode et al. |
| 6,380,149 | B2 | 4/2002 | Flynn et al. |
| 6,630,238 | B2 | 10/2003 | Hyde et al. |
| 6,632,522 | B1 | 10/2003 | Hyde et al. |
| 6,664,354 | B2 | 12/2003 | Savu et al. |
| 6,861,139 | B2 | 3/2005 | Takeda |
| 2003/0091816 | A1 | 5/2003 | Takeda |
| 2006/0100339 | A1 * | 5/2006 | Gong et al. .................... 524/445 |
| 2008/0075882 | A1 * | 3/2008 | Hayata .......................... 427/542 |
| 2008/0081872 | A1 * | 4/2008 | Osman .......................... 524/599 |
| 2009/0281002 | A1 | 11/2009 | Casper |
| 2010/0244328 | A1 * | 9/2010 | Yonezawa et al. ............. 264/447 |
| 2011/0073901 | A1 | 3/2011 | Fujita |
| 2011/0105637 | A1 | 5/2011 | Fujita |
| 2011/0282010 | A1 | 11/2011 | Fujita |

FOREIGN PATENT DOCUMENTS

| | | | |
|---|---|---|---|
| EP | 0 252 372 | 1/1988 | |
| EP | 0 448 902 | 10/1991 | |
| EP | 0 372 756 | 12/1993 | |
| EP | 1 057 861 | 12/2000 | |
| EP | 1 757 629 | 2/2007 | |
| GB | 1276673 | 6/1972 | |
| JP | 10176156 | 6/1998 | |
| JP | 2001-49200 | * 2/2001 | ................ C09J 4/06 |
| WO | WO 92/11295 | 7/1992 | |
| WO | WO 2006/093702 | 9/2006 | |
| WO | WO 2007/087281 | 8/2007 | |
| WO | WO 2009/148722 | 12/2009 | |
| WO | WO 2010/141248 | 12/2010 | |
| WO | WO 2011/017298 | 2/2011 | |
| WO | WO 2011/062851 | 5/2011 | |
| WO | WO 2011/062852 | 5/2011 | |

OTHER PUBLICATIONS

Abbate et al., "Maleated Polyisobutylene: A Novel Toughener for Unsaturated Polyester Resins", J. App. Poly. Sci. vol. 58 1825-1837 (1995).*
Takizawa et al., JP 2001-049200, machine English translation.*
Chung, et al., "Butyl rubber graft copolymers: synthesis and characterization," Polymer, vol. 36, No. 18, pp. 3565-3574, 1995.
U.S. Appl. No. 13/282,500, entitled "Ionically Crosslinkable Poly(isobutylene) Adhesive Polymers," filed Oct. 27, 2011.
U.S. Appl. No. 13/169,573, entitled "Radiation Curable Poly(isobutylene) Adhesive Copolymers," filed Jun. 27, 2011.
U.S. Appl. No. 13/282,513, entitled "Isobutylene (Co)polymeric Adhesive Composition," filed Oct. 27, 2011.
U.S. Appl. No. 13/287,148, entitled "Moisture Curable Isobutylene Adhesive Copolymers," filed Nov. 2, 2011.
U.S. Appl. No. 13/027,484, entitled "Isobutylene Copolymer with Grafted Polymer Groups," filed Feb. 15, 2011.
U.S. Appl. No. 61/432,388, entitled "Methods for Treating Siliciclastic Hydrocarbon-bearing Formations with Fluorinated Amine Oxides," filed Jan. 13, 2011.
U.S. Appl. No. 61/424,990, entitled "Method for Treating Carbonate Hydorcarbon-bearing Formations with Fluoorinated Amine Oxides," filed Dec. 21, 2010.
U.S. Appl. No. 61/262,613, entitled "Pressure Sensitive Adhesive Comprising Functionalized Polyisobutylene Hydrogen Bonded to Acylic Polymer," filed Nov. 19, 2009.
U.S. Appl. No. 61/262,611, entitled "Pressure Sensitive Adhesive Comprising Blend of Synthetic Rubber and Functionalized Synthetic Rubber bonded to an Acylic Polymer," filed Nov. 19, 2009.
Abbate, et al., "Maleated Polyisobutylene: A Novel Toughener for Unsaturated Polyester Resins," Journal of Applied Polymer Science, vol. 58, Issue 10, pp. 1825-1837, (1995).

(Continued)

*Primary Examiner* — Michael Pepitone
*Assistant Examiner* — Jessica Roswell
(74) *Attorney, Agent, or Firm* — Kent S. Kokko

(57) ABSTRACT

An adhesive (co)polymers comprising: a) an isobutylene copolymer having pendent anhydride groups, b) a polyamine photobase generator and c) optionally a tackifier is described.

15 Claims, No Drawings

(56) References Cited

OTHER PUBLICATIONS

Shirai, et al., "Photoacid and photobase generators: Chemistry and applications to polymeric materials," Progress in Polymer Science, vol. 21, pp. 1-45, (1996).

Tachi, et al., "Photochemical Reactions of Quaternary Ammonium Dithiocarbamates as Photobase Generators and Their Use in the Photoinitiated Thermal Crosslinking of Poly(gycidylmethacrylate)," Journal of Polymer Science, Part A: Polymer Chemistry, vol. 39, Issue 9, pp. 1329-1341, (2001).

Ranganathan, et al., "Peroxide-Initiated Grafting of Maleic Anhydride onto Linear and Branched Hydrocarbons," Journal of Polymer Science: Part A: Polymer Chemistry, vol. 37, Issue 20, pp. 3817-3825, (1999).

Heinen, et al., "C NMR Study of the Grafting of Maleic Anhydride onto Polyethene, Polypropene, and Ethene-Propene Copolymers," Macromolecules, vol. 29, Issue 4, pp. 1151-1157, (1996).

Shi, et al., "Functionalization of isotactic polypropylene with maleic anhydride by reactive extrusion: mechanism of melt grafting," Polymer, vol. 42, Issue 13, pp. 5549-5557, (2001).

Cameron, et al., "Photogeneration of Organic Bases from o-Nitrobenzyl-Derived Carbamates," Journal of the American Chemical Society, vol. 113, Issue 11, pp. 4303-4313, (1991).

Frechet, et al., "Photogenerated Amines and Diamines: Novel Curing Systems for Thin Film Coatings," J. Polym. Mater. Sci. Eng., vol. 64, pp. 55-56 (1991).

Cameron, et al., "Base catalysis in Imaging Materials. 1. Design and Synthesis of Novel Light-Sensitive Urethanes as Photoprecursors of Amines," The Journal of Organic Chemistry, vol. 55, Issue 23, pp. 5919-5922, (1990).

\* cited by examiner

UV CURABLE ANHYDRIDE-MODIFIED POLY(ISOBUTYLENE)

CROSS REFERENCE TO RELATED APPLICATION

This application claims the benefit of U.S. Provisional Patent Application No. 61/414,046, filed Nov. 16, 2010, the disclosure of which is incorporated by reference herein in its entirety.

TECHNICAL FIELD

This invention relates to pressure-sensitive adhesives and adhesive sealants prepared from isobutylene copolymers, and tape articles prepared therefrom. The pressure-sensitive adhesives are characterized by exhibiting an overall balance of adhesive and cohesive characteristics and exceptional adhesion to low surface-energy substrates.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of pressure sensitive adhesive (PSA) materials available today that include natural crude or synthetic rubbers, block copolymers, and acrylic ester based polymeric compositions. Central to all PSAs is a desired balance of adhesion and cohesion that is often achieved by optimizing the physical properties of the acrylic elastomer, such as glass transition temperature and modulus. For example, if the glass transition temperature ($T_g$) or modulus of the elastomer is too high and above the Dahlquist criterion for tack (storage modulus of $3 \times 10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

SUMMARY

The adhesive (co)polymers of this disclosure comprise: a) an isobutylene copolymer having pendent anhydride groups, b) a polyamine photobase generator and c) optionally a tackifier. On exposure to UV radiation, the photobase generator releases a polyamine, which crosslinks the isobutylene copolymer by reaction with the pendent anhydride groups.

In one aspect the pressure-sensitive adhesive comprises the interpolymerized reaction product of isobutylene and at least one monomer having a pendent anhydride group.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

In recent years, there has been a significant increase of the usage of low surface energy, olefin-based thermoplastics (e.g., polyethylene, polypropylene, ethylene propylene diene monomer rubber (EPDM)) in automotives, paints, appliances and electronics markets. The advantages of the new materials include affordable cost, easy processibility, and excellent mechanical properties. However, this trend creates a challenge in terms of making adhesive bonds to these low energy surfaces.

When considering adhesive tapes, pressure-sensitive adhesive (PSA) tapes are the easiest to use, but for the most part, pressure-sensitive adhesives do not adhere well to low surface energy substrates. Additionally, most PSAs are unsuited for uses requiring good internal (cohesive) strength at elevated temperatures. For example, rubber-resin PSAs tend to soften and degrade when heated. PSAs based on styrene-containing block copolymers also do not retain good internal strength when heated, because styrene has a low $T_g$ and so softens at moderately elevated temperatures. Currently the bonding to low surface-energy surfaces is achieved by priming the substrate with polar liquid followed by application of PSAs. Even after this two step process, the existing PSAs do not fulfill customer requirements. There is need to develop primerless LSE PSAs at competitive cost but still with the most optimized properties.

Recently, polyisobutylene (PIB) has been considered as an attractive material for low surface energy (LSE) bonding applications due to its excellent adhering properties on olefin-based thermoplastics. In addition, the excellent moisture and oxygen barrier properties of PIB suggest that PIB-based materials have potential use in electronic and photovoltaic encapsulation applications. In spite of its beneficial properties, low cohesive strength of the material has limited the uses for high shear applications. Another possible application for PIB-based material is in the medical adhesive field. Most acrylate-based PSAs are not suitable for medical application since acrylate PSAs tend to give off toxic vapors at elevated temperatures. Acrylate-based PSAs typically contain monomeric materials which, even at ordinary room temperatures, exude odors that make acrylate PSA tapes generally unsuitable for medical uses. Polyisobutylene PSAs are often used for medical uses because they are physiologically inert, but again they tend to be deficient in internal strength.

The adhesive compositions of the present disclosure provide an improved pressure-sensitive and hot-melt adhesive composition which may be adhered to a variety of substrates, including low surface-energy (LSE) substrates, within a wide temperature range and provide good adhesive strength and holding characteristics. The adhesive compositions are easily handled, and are environmentally friendly due to the low volatile organic compound (VOC) content, such as solvents. The adhesive compositions of the present disclosure further provide a pressure-sensitive adhesive article, such as adhesive tapes and sealants.

As Used Herein

"Alkyl" means a linear or branched, cyclic or acylic, saturated monovalent hydrocarbon having from one to about twelve carbon atoms, e.g., methyl, ethyl, 1-propyl, 2-propyl, pentyl, and the like.

"Alkylene" means a saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Aryl" menas a monovalent aromatic, such as phenyl, naphthyl and the like.

"Arylene" means a polyvalent, aromatic, such as phenylene, naphthalene, and the like.

"Aralkylene" means a alkylene defined above with an aryl group attached to the alkylene radical, e.g., benzyl, 1-naphthylethyl, and the like.

DETAILED DESCRIPTION

The adhesive (co)polymers of this disclosure comprise: a) an isobutylene copolymer having pendent anhydride groups, b) a polyamine photobase generator and c) optionally a tackifier.

The isobutylene copolymer having pendent anhydride groups may be prepared by free radical addition of maleic anhydride to an isobutylene copolymer. Such free radical addition leads to a complex mixture of anhydride substituted products including hydrogen abstraction products, beta-scission products and free-radical polymerization of maleic anhydride. Such complex addition products may be represented by the generalized formula:

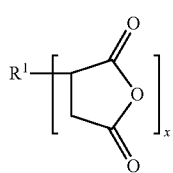

I wherein
$R^1$ represents the polymeric isobutylene radical having at least 20 repeat units and subscript x represents a fraction of those repeat units substituted by the cyclic anhydride. Typically 1 to 5 percent of the repeat units of the isobutylene copolymer will be substituted by cyclic anhydride groups.

The maleated polyisobutylene of Formula I may be prepared by free radical addition of maleic anhydride to a halogenated PIBs, including halogenated poly(isobutylene-co-methylstyrene), halogenated poly(isobutylene-co-isoprene) and non-halogenated polyisobutylenes such as butyl rubbers. There are several commercially-available halogenated polyisobutylene, but alternatively a non-halogenated polyisobutylene may be halogenated, then subsequently substituted. The halogen moiety in those materials allows introduction of the pendent ethylenically unsaturated groups. Non-halogenated polyisobutylenes may be likewise functionalized, typically by generating free radicals at the allylic positions of the polymer chain.

The starting copolymers of isobutylene may include those wherein isobutylene is copolymerized with another monomer, which may be subsequently modified to include the pendent group. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). In some embodiments, the copolymers are substantially homopolymers of isobutylene, for example, polyisobutylene resins, which may be subsequently modified to include the pendent unsaturated group, available under the tradenames OPPANOL (BASF AG) and GLISSOPAL (BASF AG). The copolymers also include copolymers of mostly isobutylene with n-butene or butadiene, which may be subsequently modified to include the pendent unsaturated group. In some embodiments, a mixture of copolymers may be used, i.e., the first polyisobutylene comprises a homopolymer of isobutylene and the second polyisobutylene comprises butyl rubber, or the first polyisobutylene comprises butyl rubber and the second polyisobutylene comprises a copolymer of isobutylene, subsequently modified. Blends of isobutylene homopolymer and modified poly(isobutylene) are also contemplated.

The isobutylene copolymer may comprise a random copolymer of isobutylene and modified para-methylstyrene units, wherein said random copolymer contains 1 to 20% by weight of said modified para-methylstyrene units. This random copolymer is, for example, commercially available from Exxon Chemical Co. under the trade name of EXXPRO series, and examples thereof include MDX90-10, MDX89-4. A portion of the methyl groups at the para-position of this para-methylstyrene can be brominated to form a site for the subsequent free radical initiation and addition to maleic anhydride. Accordingly, a crosslinked structure can be formed by the technique described in detail hereinafter. Particularly, regarding the copolymer MDX90-10, 1.2% by mol of para-methylstyrene, which is contained in the copolymer in the amount of 7.5% by weight, is brominated. Regarding MDX89-4, 0.75% by mol of para-methylstyrene, which is contained in the copolymer in the amount of 5% by weight, is brominated. In addition, bromination of para-methylstyrene and random polymerization between isobutylene and para-methylstyrene, for the purpose of producing a random copolymer, can be performed by known techniques.

Para-methylstyrene monomer units can also impart heat resistance and strength to the copolymer by the cohesive force and hardness of para-methylstyrene itself. To obtain such an effect, para-methylstyrene is preferably contained in the copolymer in amounts of greater than zero, preferably about 1 to 20 parts by weight based on the total amount of the copolymer. When the amount of para-methylstyrene is smaller than 1 part by weight, the cohesive force is insufficient and it becomes difficult to obtain enough adhesion to endure practical use. On the other hand, when the amount of para-methylstyrene is larger than 20 parts by weight, the flexibility is drastically lowered and the adhesion as an important characteristics of the adhesive disappears and, therefore, it becomes impossible to refer to it as a pressure-sensitive adhesive any longer.

The polyisobutylene may be halogenated or non-halogenated and may be of the structure:

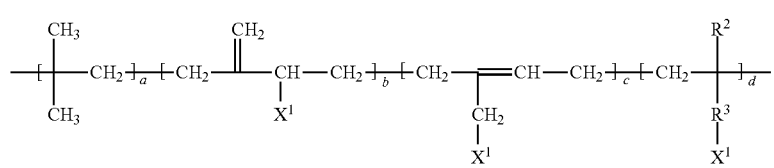

III wherein the subscripts a to d represent the number of repeat units of the constituent monomer units, a is at least 20, and at least one of b, c and d are at least one, $R^2$ is H or $CH_3$, and $R^3$ is an alkenyl group, an arylene group or combination thereof, and $X^1$ is a halogen atom such as a bromine (for halogenated polyisobutylenes) or H (for non-halogenated polyisobutylenes). The subscripts "b" and "c" or "d" are chosen such that the copolymer comprises 1 to 20 wt. % of the respective monomer units e.g. b, c and d are such that the monomer units comprise 1 to 20 wt. % of the copolymer. In Formula III each of subscripts b, c and d may be replaced by subscripts b*, c* and d* that represent the fraction of the b, c and d (respectively) monomer units substituted by the pendent halogen atom. The degree of halogen substitution is such that b*+c*+d* is generally 1 to 5 wt. % of the polymer. It will be understood that the polymer may contain both halogen-substituted monomer units (b*, c* and d*) as well as non-halogen substituted monomer units (a, b, c and d).

The addition reaction scheme involves a free radical addition between a halogenated polyisobutylene and maleic anhydride as illustrated in Scheme 1 below with a isobutylene bromomethyl styrene copolymer wherein $X^1$ is a halide, a is at least 20, and b is at least one.

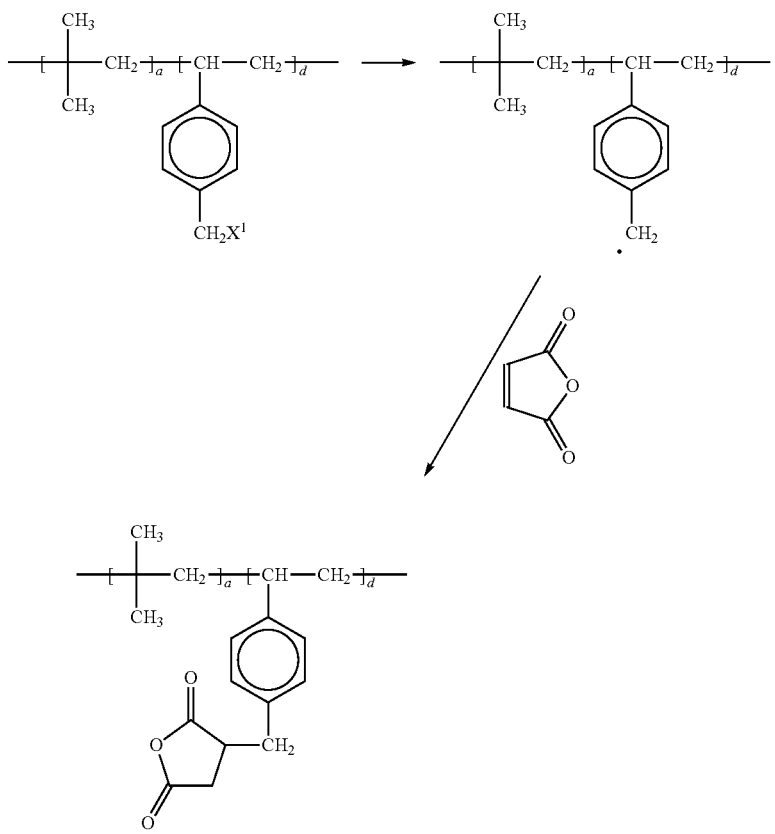

Scheme 1

Alternatively, a non-halogenated polyisobutylene, such as a butyl rubber, may be treated with a free radical initiator to generate free radical on the polymer chain, and subsequently treated with maleic anhydride. With respect to the polyisobutylene of Formula III, typically the allylic or benzylic positions of monomer units b, c and/or d are free-radically substituted.

The non-halogenated (e.g. PIB) synthetic rubber material can be a homopolymer, copolymer, or a mixture thereof. Copolymers can be random or block copolymers. Block copolymers can include the polyisobutylene sections in the main backbone, in a side chain, or in both the main backbone and a side chain of the polymeric material. The polyisobutylene material is typically prepared by polymerizing isobutylene alone or by polymerizing isobutylene plus additional ethylenically unsaturated monomers in the presence of a Lewis Acid-catalyst such as aluminum chloride, boron trichloride (with titanium tetrachloride as a cocatalyst), or boron trifluoride.

Non-halogenated polyisobutylene materials are commercially available from several manufacturers. Homopolymers are commercially available, for example, under the trade designation OPPANOL (e.g., OPPANOL B10, B15, B30, B50, B100, B150, and B200) from BASF Corp. (Florham Park, N.J.). These polymers often have a weight average molecular weight ($M_w$) in the range of about 40,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole.

As previously described, the free radical addition is complex. The nominal substitution product is at the benzylic carbon as shown, however the succinyl group may be substituted at any of the aliphatic carbon atoms shown in Scheme 1. It will be appreciated that the reaction product may further comprise such free radical substitution products that result from hydrogen abstraction of the depicted aliphatic hydrogen atoms, pendent homo-polymers or oligomers of maleic anhydride, and pendant succinyl groups resulting from β-scission. Reference may be made to S. Ranganathan et al., J. Poly, Chem., Part A, Vol. 36, 3817-3825 (1999), H. J. M. de Groot et al., Macromol., Vol. 29, 1151-1157 (1996), H. Huang et al., Polymer, Vol 42, 5549-5557 (2001) and M. Abbate, et al., Journal of Applied Polymer Science, 58: 1825-1837(1995)

Any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 64 (2,2'-azo-bis(isobutyronitrile)) and VAZO™ 52, and Lucidol™ 70 from Elf Atochem North America, Philadelphia, Pa.

The initiator is used in an amount effective to facilitate free radical addition of the monomer and the amount will vary depending upon, e.g., the type of initiator, and the molecular weight of the polymer and the degree of functionalization desired. The initiators can be used in amounts from about 0.001 part by weight to about 1 parts by weight based on 100 parts isobutylene copolymer.

In one embodiment, the free radical addition may comprise a solution polymerization method, whereby the monomer and the isobutylene polymer, and a suitable inert organic solvent are charged into a reaction vessel and then purged with nitrogen to create an inert atmosphere. Once purged, the solution within the vessel is optionally heated, the initiator is added, and the mixture is stirred during the course of the reaction.

Reactive extrusion, such as the continuous free radical polymerization methods described in U.S. Pat. Nos. 4,619, 979 and 4,843,134 (both Kotnour et al., both incorporated herein by reference), may also be utilized to prepare the adhesives of the disclosure. Reactive extrusion is a solventless technology where the free radical addition is initiated by thermal means. The monomer and isobutylene polymer and the initiator are fed to an extruder. The temperature along the extruder is varied to control the free radical addition. Chain transfer agents are added to control the molecular weight and prevent gel formation. The functionalized polymer obtained at the end of the extruder may then be hot melt coated on to a suitable substrate.

The monomer units having pendent succinyl groups may be derived from halogenated butyl rubber and are of the general formula III:

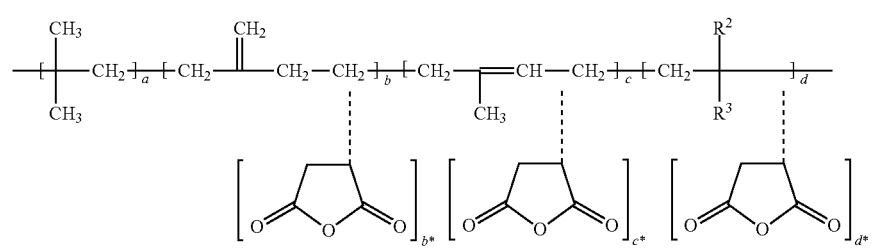

III wherein a is at least 20, and at least one of b, c and d are at least one, $R^2$ is H or $CH_3$, and $R^3$ is an alkyl group, an aryl group or combination thereof. The subscripts b*, c* and d* represent the fraction of the b, c and d (respectively) monomer units substituted by the pendent succinyl group. It may be noted that the succinyl group is not shown as bonded to any particular carbon, as result of α-cleavage and β-scission, but may be attached to any non-tertiary carbon atom. Generally the succinyl group is attached to a benzylic or allylic carbon atom and a mixture of free-radical substitution products results. Further, with regard to Formulas I and II, the subscripts "b" and "c" or "d" are chosen such that the copolymer comprises 1 to 20 wt. % of the respective monomer units: e.g. b and c are such that the -Q-Z monomer units comprise 1 to 20 wt. % of the copolymer. The degree of substitution is such that a*+b*+c*+d* is 1 to 5 wt. %

As a result of β-scission, the pendent succinyl group may be represented as:

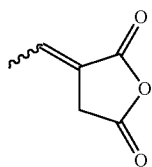

In some preferred embodiments, the succinyl substituted polyisobutylene copolymer may be represented as

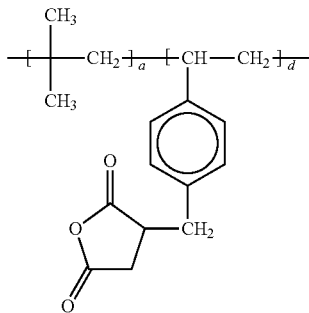

where a is at least 20, d is at least 1. Preferably d is chosen to comprise 1 to 20 wt. % of the copolymer.

The copolymer of Formula I is generally prepared by free radical addition of an α,β-unsaturated anhydride to a commercially available halogenated PIBs, including halogenated poly(isobutylene-co-methylstyrene), halogenated poly(isobutylene-co-isoprene). Alternatively, a non-halogenated PIB-based material may be halogenated, then subsequently substituted by free radical addition. The halogen moiety in those materials allows introduction of the pendent anhydride groups. Alternately, a non-halogenated polyisobutylene may be used.

The adhesive composition further comprises a polyamine photobase generator that, on exposure to radiation, provides a polyamine. The use of the photobase generator (PBG) overcomes a problem in the art by controlling the rate of crosslinking. It has been found that anhydride-functional poly(isobutylene) polymer can be crosslinked by polyamines. However, due to its high reactivity, the crosslinking reactions are very fast and uncontrollable. Mixing anhydride-functional poly(isobutylene) polymers and polyamines results in instant gelation. The use of a photobase-generator (PBG) can create free amines upon UV irradiation. When a polyamine photobase generator is formulated with anhydride-functional poly(isobutylene) polymer, the mixture is very stable and easy to process (e.g., coating) without any gelation. UV irradiation on this formulation can instantly generate free polyamines which can form chemical crosslinking by reacting with anhydride modified polyolefins.

The photobase generator is not specifically limited so long as it generates a polyamine directly or indirectly with light irradiation. The photobase generator includes for example bis[[(2-nitrobenzyl)oxy]carbonylhexane-1,6-diamine], nitrobenzyl cyclohexyl carbamate, di(methoxybenzyl)hexamethylene dicarbamate and the compounds of the general formulae: $(R^5—NR^6)_x—R^7$, where $R^5$ is a photoactive group including benzyloxy groups and formal groups, $R^6$ is a hydrogen or alkyl group, $R^7$ is polyvalent alkyl or aryl group, and x is at least 2. It will be understood that the formula represents a polyamine photobase generator wherein the polyamine liberated by photolysis is of the formula $(HNR^6)_x—R^7$.

Photobase generators useful in the present invention are any compounds which liberate base upon exposure to light, typically at a wavelength of about 320 to 420 nanometers, however other wavelengths may be suitable. Suitable photobase generators include, but are not limited to: benzyl carbamates, benzoin carbamates, o-carbamoylhydroxyamines, O-carbamoyloximes, aromatic sulfonamides, alpha-lactams, N-(2-allylethenyl)amides, arylazide compounds, N-arylformamides, and 4-(ortho-nitrophenyl)dihydropyridines.

More specifically, suitable o-carbamoylhydroxylamines include compounds of the formula $[R^{10}R^{11}OC(=O)NR^{12}]_x R^{13}$ where $R^{10}$ and $R^{11}$ are independently alkyl, aryl or acyl, $R^{12}$ is hydrogen or alkyl and $R^{13}$ is polyvalent alkyl or aryl, and x is at least 2. Suitable O-carbamoyloximes include compounds of the formula $[R^{10}R^{11}C(=N)OC(=O)NR^{12}]_x R^{13}$ where $R^{10}$ and $R^{11}$ are independently hydrogen, alkyl or aryl, $R^{12}$ is alkyl or aryl, $R^{13}$ is alkylene or arylene having a valence of x, and x is at least 2. Suitable sulfonamides include compounds of the formula $[ArS(=O)_2NR^{10}]_x R^{13}$ where Ar is an aryl group, $R^{10}$ is hydrogen or alkyl and $R^{13}$ is polyvalent alkyl or aryl and x is at least 2. Suitable alpha-lactams include compounds of the formula (IV):

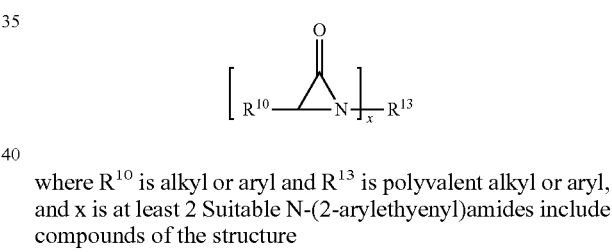

where $R^{10}$ is alkyl or aryl and $R^{13}$ is polyvalent alkyl or aryl, and x is at least 2 Suitable N-(2-arylethyenyl)amides include compounds of the structure $$\left[ \begin{array}{c} R^{10} \\ \diagdown \\ \phantom{xx}C=O \\ \phantom{xxxx}\diagdown \\ \phantom{xxxxxx}N—R^{13} \\ \phantom{xxxx}\diagup \\ CHAr=CH \end{array} \right]_x$$

where Ar is an aryl group, $R^{10}$ is alkyl or aryl, $R^{13}$ is a polyvalent alkyl or aryl, and x is at least 2. Other amides also will be suitable, for example formanilide and other aryl substituted amides. In the above described formulas, aryl is typically phenyl. As referred to in the above formulas, an alkyl group may be of a straight chain or branched configuration, or comprise a cyclic structure, and typically contains from 1 to 15 carbon atoms, more typically from 1 to 6 carbon atoms. An alkyl group is suitably either unsubstituted or substituted at one or more available positions. The substituents may be, for example, halo, aryl, or alkyl. Similarly, an aryl group also may be unsubstituted or substituted at one or more available positions by, for example, halo, aryl or alkyl.

Specifically preferred organic base generators include bis-2-hydroxy-2-phenylacetophenone N-cyclohexyl carbamate

[i.e., [(C$_6$H$_5$C(=O)CH(C$_6$H$_5$)OC(=O)NH]$_2$C$_6$H$_{10}$], bis-o-nitrobenzyl N-cyclohexyl carbamate [o-NO$_2$C$_6$H$_5$CH$_2$OC(=O)NH]$_2$C$_6$H$_{10}$], bis-N-cyclohexyl-2-naphthalene sulfonamide [C$_{10}$H$_7$SO$_2$NH]$_2$C$_6$H$_{10}$], bis-3,5-dimethoxybenzyl N-cyclohexyl carbamate [(CH$_3$O)$_2$C$_6$H$_5$CH$_2$OC(=O)NH]$_2$C$_6$H$_{10}$], and bis-N-cyclohexyl p-toluene sulfonamide [p-CH$_3$C$_6$H$_5$SO$_2$NH]$_2$C$_6$H$_{10}$].

Preparation of photobase generator compounds is known in the art. For example, suitable benzyl carbamates can be prepared by the reaction of a diisocyanate with a benzyl alcohol in the presence of a suitable catalyst. Thus dibenzoin isophorone dicarbamate is prepared by reaction of benzoin with isophorone diisocyanate in a suitable solvent, typically with heating, and in the presence of a suitable catalyst such as methyllithium. Suitable solvents include ether and tetrahydrofuran. Photoactivation of this base generator provides isophoronediamine. See J. Cameron et al., J. Am. Chem. Soc., vol. 113, no. 11, 4303-4313 (1991); J. Cameron et al., J. Polym. Mater. Sci. Eng., 64, 55 (1991); and J. Cameron, et al., J. Org. Chem., 55, 5919-5922 (1990), all of which are incorporated herein by reference for their teaching of preparation of photobase generators. Bis-ortho-nitrobenzyl N—,N'-cyclohexylcarbamate can be prepared by reaction of cyclohexyldiisocyanate and 2-nitrobenzyl alcohol in a heated toluene solution until reaction completion. See U.S. Pat. No. 5,650,261 (Winkel), incorporated herein by reference for its teaching of photobase generators and the preparation thereof. The synthesis of sulfonamides is well known and generally involves reaction of a sulfonyl chloride with an amine. Thus N—,N'-cyclohexyl bis-p-toluenesulfonamide is prepared by reaction of p-toluenesulfonyl chloride and cyclohexyl diamine in a suitable solvent with heating.

Photobase generators are further described in M. Shirai et al. Photochemical Reactions of Quaternary Ammonium Dithiocarbamates as Photobase Generators and Their Use in The Photoinitiated Thermal Crosslinking of Poly(gycidylmethacrylate), Journal of Polymer Science, Part A: Polymer Chemistry, vol. 39, pp. 1329-1341 (2001) and M. Shirai et al., "Photoacid and photobase generators: chemistry and applications to polymeric materials", Progress in Polymer Science, vol. 21, pp. 1-45, XP-002299394, 1996.

The use of a photobase generator may produce residue products from the photochemical production of base. Upon exposure to actinic radiation, the photobase generator will photolyze yielding a polyamine and a residue compound. For example, a bis-benzyl carbamate of a diamine will photolyze to yield the diamine and a phenyl ketone as the "residue of a photobase generator". Oxime esters will yield ketones. Such residues are present in small amounts and do not normally interfere with the desired optical properties of the resulting polarizer. The residues may be detected by conventional analytical techniques, such as infrared, ultraviolet and NMR spectroscopy, gas or liquid chromatography, mass spectroscopy, or a combination of such techniques. Thus, the present invention may comprise cured poly(isobutylene) adhesive copolymer and detectable amounts of residues from a photobase generator.

Useful photobase generators are derived from polyamines, including di- and higher amines. Useful polyamines are of the general formula $R^{13}$—(NR$^{10}$H)$_x$, where $R^{10}$ is H or alkyl, and $R^{13}$ is a polyvalent alkylene or arylene, and x is at least 2.

Useful polyamines include, for example, polyamines having at least two amino groups, wherein two amino groups are primary, secondary, or a combination thereof. Examples include 1,10-diaminodecane, 1,12-diaminododecane, 9,9-bis (3-aminopropyl)fluorene, 2-(4-aminophenyl)ethylamine, 1,4-butanediol bis(3-aminopropyl)ether, N(CH$_2$CH$_2$NH$_2$)$_3$, 1,8-diamino-p-menthane, 4,4'-diaminodicyclohexylmethane, 1,3-bis(3-aminopropyl)tetramethyldisiloxane, 1,8-diamino-3,6-dioxaoctane, 1,3-bis(aminomethyl)cyclohexane, Examples of useful polyamines include polyamines having at least three amino groups, wherein the three amino groups are primary, secondary, or a combination thereof include H$_2$N(CH$_2$CH$_2$NH)$_2$H, H$_2$N(CH$_2$CH$_2$NH)$_3$H, H$_2$N(CH$_2$CH$_2$NH)$_4$H, H$_2$N(CH$_2$CH$_2$NH)$_5$H, H$_2$N(CH$_2$CH$_2$CH$_2$NH)$_2$H, H$_2$N(CH$_2$CH$_2$CH$_2$NH)$_3$H, H$_2$N(CH$_2$CH$_2$CH$_2$CH$_2$NH)$_2$H, H$_2$N(CH$_2$CH$_2$CH$_2$CH$_2$CH$_2$NH)$_2$H, H$_2$N(CH$_2$)$_4$NH(CH$_2$)$_3$NH$_2$, H$_2$N(CH$_2$)$_3$NH(CH$_2$)$_4$NH(CH$_2$)$_3$NH$_2$, H$_2$N(CH$_2$)$_3$NH(CH$_2$)$_2$NH(CH$_2$)$_3$ NH$_2$, H$_2$N(CH$_2$)$_2$NH(CH$_2$)$_3$NH(CH$_2$)$_2$NH$_2$, H$_2$N(CH$_2$)$_3$ NH(CH$_2$)$_2$NH$_2$, C$_6$H$_5$NH(CH$_2$)$_2$NH(CH$_2$)$_2$NH$_2$, and N(CH$_2$CH$_2$NH$_2$)$_3$.

The most preferred di- or polyamines include aliphatic diamines or aliphatic di- or polyamines and more specifically compounds with two primary amino groups, such as ethylene diamine, hexamethylene diamine, dodecanediamine, and the like.

The reaction mechanism may be illustrated as follows in Scheme 3. Under the incident actinic radiation, the photobase generator photolyses yielding a polyamine ($R^{13}$—(NR$^{10}$H)$_x$, where $R^{10}$ is H or alkyl, and $R^{13}$ is a polyvalent alkylene or arylene, and x is at least 2) and the residue of the photobase generator. The liberated polyamine adds nucleophilically to the pendent succinyl group forming the illustrated amide. Where $R^{10}$ is an H, the amide nitrogen may react with the remaining acid group to form a succinimide. The free amine —NR$^{10}$H can react with adjacent pendent succinyl groups to crosslink the system.

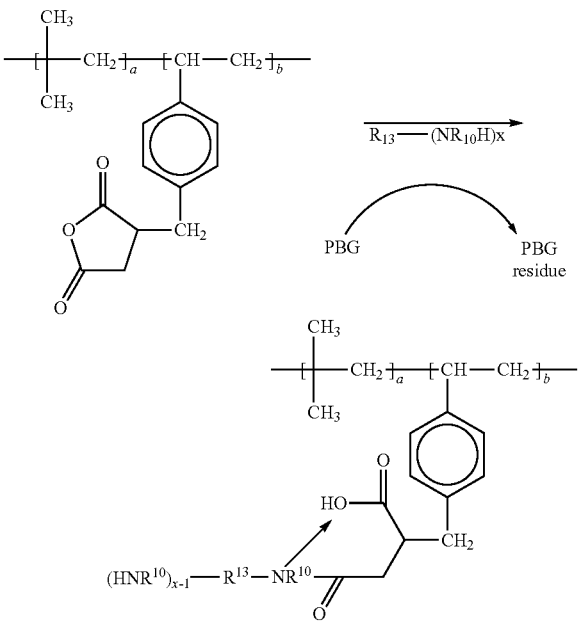

Scheme 3

Further, as a photosensitizer, prior known photosensitizers may be used. The photosensitizer includes for example thioxanthenes, xanthenes, ketones, thiopyrylium salts, basestyryls, merocyanines, 3-substituted coumarins, 3,4-substituted coumarins, cyanines, acridines, thiazines, phenothiazines, anthracenes, coronenes, benzanthracenes, perylenes, ketocoumarines, fumarines and borates. These may be used alone or in a combination of two or more.

Conventional adhesives do not adhere well to certain substrates, such as certain types of automotive paints and low energy surfaces. Efforts have been made to improve the adhesion of adhesives, i.e., develop more aggressive tack, to these types of surfaces; tackifying the base polymer is commonly practiced. Various types of tackifiers include phenol modified terpenes, hydrocarbon resins such as polyvinyl cyclohexane and poly(t-butyl styrene), and rosin esters such as glycerol esters of rosin and pentaerythritol esters of rosin.

Various types of tackifiers include phenol-modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by products of naphtha cracking and are available under the trade names Piccotac™, Eastotac™, Regalrez™, Regalite™ (Eastman), Arkon™ (Arakawa), Norsolene™, Wintack™ (Cray Valley), Nevtack, LX (Neville Chemical Co.), Hikotack™, Hikorez™ (Kolon Chemical), Novares™ (Rutgers N. V.), Quintone™ (Zeon), Escorez™ (Exxonmobile Chemical), Nures™, and H-Rez™ (Newport Industries).

Conventional tackified pressure-sensitive adhesives can also appear cloudy, demonstrating a loss in the characteristic transparency found in many conventional pressure-sensitive adhesive compositions. The cloudiness is an indication of limited or incomplete compatibility of the tackifier and the polymers. The reduced compatibility can lead to a degradation of adhesive properties on aging, as evidenced by a loss of tack or reduced peel adhesion. In some cases, the addition of a tackifier to an adhesive composition can be clear and appear to be compatible. However, after removing the solvent, curing the adhesive, or on aging, the adhesive can become cloudy, indicating some incompatibility between the tackifier and acrylic base polymer.

In many embodiments, the present disclosure provides tackified adhesive compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Regalrez™ tackifiers (Eastman) or Arkon™ (Arakawa) tackifiers. Such "hydrophobic tackifiers", may be used in amounts of greater than zero, e.g. 10 to 150 parts, preferably 10 to 100 parts, of said tackifier, relative to 100 parts of said isobutylene co)polymer.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of from 0 to about 200 parts by weight per 100 parts by weight of the copolymer.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester poly(ethylene terephthalate), polycarbonate, poly(methyl methacrylate) (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference. Those skilled in the art will also know that other additives such as fillers, antioxidants, stabilizers, and colorants may be blended with the adhesive for beneficial properties.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

In some embodiments, the adhesive compositions, particularly pressure-sensitive adhesive compositions, are applied as a solvent solution or dispersion, the solvent evaporated, and the adhesive composition crosslinked on exposure to actinic radiation, such as UV. Crosslinking of such solvent-based compositions may occur before, but preferably occurs after coating and solvent removal. Suitable solvents such as alkanes, ethyl acetate, toluene and tetrahydrofuran which are unreactive with the functional groups of the components of the copolymer The adhesive composition can be cured using a source of actinic radiation of sufficient energy (i.e., wavelength range) to generate polyamines when incident upon the particular photobase generator selected for use in the composition. The preferable wavelength range for the photobase generator disclosed above is 250 to 400 nm. The radiant energy in this preferred range of wavelengths required to crosslink the adhesive film of the invention is 100 to 1500 mJ/cm$^2$ and more preferably 200 to 800 mJ/cm$^2$. Details of the photocure process are disclosed in U.S. Pat. Nos. 4,181,752 and 4,329,384.

EXAMPLES

As used in this section, the word polymer may be a homopolymer or a co-polymer, or a mixture thereof.
Test Methods:
90° Angle Peel Adhesion Strength Test.

Peel adhesion strength was measured at a 90° angle using an IMASS SP-200 slip/peel tester (available from IMASS, Inc., Accord Mass.) at a peel rate of 305 mm/minute (12 inches/minute) using the procedure described in ASTM International standard, D3330, Method F. Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C./50% RH for 24 hours before testing. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface, and 2-B (2-Bond)—the adhesive peeled away from the backing

TABLE 1

Peel Adhesion Test Panel Materials

| Material | Solvent |
| --- | --- |
| HDPE—High density polyethylene | Isopropyl alcohol |
| PP—Polypropylene | Isopropyl alcohol |
| EPDM—Ethylene/propylene/diene monomer copolymer | Isopropyl alcohol |
| TPE—Thermoplastic Elastomer based on EPDM and polypropylene—Santoprene ™ | Isopropyl alcohol |
| SS—Stainless Steel | Heptane |
| Glass—Soda-lime glass | Heptane |

Static Shear Strength

The static shear strength was evaluated as described in the ASTM International standard, D3654, Procedure A at 23° C./50% RH (relative humidity) using a 1000 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room or a 70° C. oven. The time to failure in minutes was recorded. If no failure was observed after 10,000 minutes, the test was stopped and a value of >10,000 minutes was recorded. The mode of failure described in the peel adhesion test was also noted.
Percent Gel Test The percent gel was determined as described in the ASTM International standard, D3616-95. A round test specimen measuring 63/64 inch in diameter was die-cut from a tape coated with the polymer and cured. The specimen was placed in a mesh basket measuring 1½ inch×1½ inch. The basket with the specimen was weighed to the nearest 0.1 mg and placed in a capped jar containing sufficient toluene to cover the sample. After 24 hours the basket (containing the specimen) was removed, drained and placed in an oven at 120° C. for 30 minutes. The percent gel was determined by calculating weight % of the remaining, unextracted portion to the original sample. A disc of the uncoated polyester backing material of the same size as the specimen was die-cut and weighed. The formula used for percent gel determination is shown below:

$$\text{Wt \% Gel} = \frac{\left(\left(\begin{array}{c}\text{Unextracted sample wt. after extraction} - \\ \text{uncoated backing wt.}\end{array}\right)\right)}{(\text{Original sample wt.} - \text{uncoated backing wt.})} \times 100$$

Materials Used for Examples

The following materials are available from ExxonMobil Corporation (Baytown, Tex.)
  EXXPRO 3745 copolymer—brominated poly(isobutylene-co-methylstyrene)
  ESCOREZ 1310 tackifier—hydrocarbon based tackifier
The follow materials are available from Sigma Aldrich (St. Louis, Mo.)
  Maleic anhydride
  Chlorobenzene
  Dicumyl Peroxide (Bis-(1,1'-dimethylbenzyl)peroxide)
  2-Nitrobenzyl alcohol
  Dibutyltin dilaurate
  Benzene
  Acetone
Other materials used
  Trimethylhexamethylene diisocyanate (2,2,4- and 2,4,4-mixtures) available from TCI America (Portland, Oreg.)
  OPPANOL B 15 polymer—polyisobutylene (Medium MW 80K g/mol unfunctionalized synthetic rubber) available from (BASF, Florham Park N.J.)
  GLISSOPAL 1000—unfunctionalized polyisobutylene (Low MW 1000 g/mol) available from BASF, Florham Park, N.J.
  Hostaphan® 3SAB—primed polyester film available from Mitsubishi, Greer S.C.

Preparation of Maleic Anhydride-Modified Polyisobutylene (MAMP)

A composition for a modified isobutylene polymer was prepared by adding 30.00 g of polyisobutylene (EXXPRO 3745 co-polymer), 6.00 g of maleic anhydride, 0.75 g dicumyl peroxide, and 200 g chlorobenzene to a three-neck, round-bottomed flask equipped with a reflux condenser, thermometer, and a nitrogen inlet. The composition was stirred with a magnetic stir bar under nitrogen at room temperature until all of the components were completely dissolved. The flask was then heated to 130° C. for 4 hours. The reaction mixture was then cooled to room temperature and the solution was poured into acetone to coagulate the modified polymer. The isolated polymer was washed with fresh acetone three times to remove the unreacted maleic anhydride and dicumyl peroxide. The resulting maleic anhydride modified isobutylene polymer was filtered and dried in a vacuum oven for 12 hours at 50° C., and then cooled to room temperature.

Preparation of Photobase Generator

A composition for a photobase generator was prepared by adding 20.00 g of 2-nitrobenzyl alcohol, 0.2 g of dibutyltin dilaurate, and 84 g of benzene to a three-neck, round-bottomed flask equipped with a reflux condenser, dropping funnel and a nitrogen inlet. The composition was stirred with a magnetic stir bar under nitrogen at room temperature. A mixture of 13.73 g of trimethyl hexamethylene diisocyanate and 50 g of benzene was charged to the dropping funnel and slowly added to the flask over 20 minutes. After all of the components dissolved completely, the flask was heated to 80° C. After 3 hours, the composition was cooled to room temperature and the solution was evaporated under reduced pressure using a rotary evaporator yielding a slightly yellow viscous material that was a photobase ortho-nitrobenzyl-derived-bicarbamate.

Examples 1-3 and Control Compositions C1-C3

Adhesive compositions for Examples 1-3 were prepared by adding varying amounts of maleic anhydride-modified polyisobutylene (MAMP) and unmodified polyisobutylene (Oppanol B15 polymer) shown in Table 2, 400 parts of toluene, 10 pph (parts her hundred parts of polymer) of tackifier (ESCOREZ 1310), 10 pph of low molecular weight polyisobutylene plasticizer (Glissopal 1000), and 15 pph photobase generator in 100 mL glass jars. The total amount of polymer (MAMP and unmodified polyisobutylene) was maintained at 100 parts. The jars were capped and mixed on a roller mill overnight.

Compositions for Control Examples C1-C3 were prepared in the same manner with the same amounts and types of tackifiers and plasticizers except that unmodified EXXPRO 3745 was used instead of MAMP and no photobase generator was added.

The resulting compositions were each knife coated onto 6 inch by 25 inch strips of polyester film (Hostaphan® 3SAB) to a thickness of 15 mils wet. The coated films were dried in an oven set 70° C. for 20 minutes to provide tapes having an adhesive thickness of approximately 2 mils. The coated tapes for Examples 1-3 were then cured by irradiating with UV light (400 mJ/cm$^2$, UVB) using a UV processor (Fusion UV System, Inc., Gaithersburg, Md.). Tapes for Control Examples were not irradiated. The tapes were conditioned at 23° C. and 50% relative humidity for 24 hours before testing.

The tapes were tested for shear strength at room temperature on stainless steel panels with results shown in Table 2, and for 90° peel adhesion on various substrates with results shown in Table 3.

TABLE 2

Adhesive Compositions and Adhesive Tape Shear Strength

| Ex | Maleated Exxpro 3745 (parts) | Exxpro 3745 (parts) | Oppanol B15 PIB (pph) | Room Temp Shear (min) | Failure Mode |
|---|---|---|---|---|---|
| 1 | 100 | 0 | 0 | >10,000 | None |
| 2 | 70 | 0 | 30 | >10,000 | None |
| 3 | 40 | 0 | 60 | >10,000 | None |
| C1 | | 100 | 0 | 3,500 | COH |
| C2 | | 70 | 30 | 300 | COH |
| C3 | | 40 | 60 | 50 | COH |

TABLE 3

Peel Adhesion Strength

| | 90° Peel Adhesion (N/dm) | | | | | | |
|---|---|---|---|---|---|---|---|
| Ex | HDPE | PP | EPDM | TPE | SS | Glass | Failure Mode |
| 1 | 6 | 15 | 20 | 1 | 48 | 49 | ADH |
| 2 | 7 | 41 | 40 | 9 | 63 | 57 | ADH |
| 3 | 13 | 36 | 53 | 39 | 51 | 58 | ADH |

TABLE 3-continued

| | | | Peel Adhesion Strength | | | | |
|---|---|---|---|---|---|---|---|
| | | | 90° Peel Adhesion (N/dm) | | | | |
| Ex | HDPE | PP | EPDM | TPE | SS | Glass | Failure Mode |
| C1 | 6 | 7 | 43 | 74 | 29 | 25 | ADH, COH |
| C2 | 17 | 57 | 40 | 107 | 52 | 39 | COH |
| C3 | 21 | 59 | 84 | 74 | 51 | 46 | COH |

Example 4 and Control Example C4

Polymer compositions were prepared for Examples 4 and C4 by dissolving 100 parts of the polymer shown in Table 4 in 400 parts of toluene and adding 15 pph of the photobase generator. Tapes were prepared from the compositions as described in Example 1 by coating the composition onto polyester backings, drying, and exposing to UV radiation to cure the adhesive. The gel content of the adhesives was determined as described in the above Test Methods and results are shown in Table 4.

TABLE 4

| | Percent Gel Test Results | | |
|---|---|---|---|
| Ex | Polymer | Photobase Generator (pph) | Gel Content (wt %) |
| 4 | MAMP | 15 | 75 |
| C4 | Exxpro 3745 | 15 | 1 |

What is claimed is:

1. An adhesive composition comprising: a) an isobutylene copolymer having pendent anhydride groups, b) a polyamine photobase generator which releases a polyamine on exposure to UV radiation, and c) 10 to 100 parts by weight of a tackifier per 100 parts by weight of said copolymer, said tackifier selected from hydrogenated rosin resins, hydrogenated and esterified rosin resins, hydrogenated terpene resins, aliphatic petroleum resins, aromatic petroleum resins, and alicyclic petroleum resins.

2. The adhesive composition of claim 1 wherein said isobutylene copolymer comprises greater than 0% by weight but less than 20% by weight of polymerized monomer units having pendent anhydride groups.

3. The adhesive composition of claim 1 wherein the pendent anhydride groups are succinic anhydride groups.

4. The adhesive composition of claim 1 wherein said copolymer is of the formula:

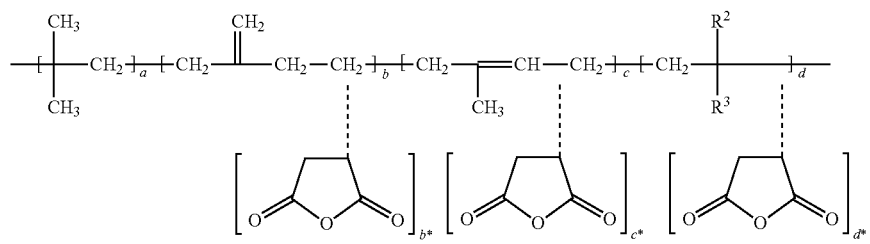

wherein a is at least 20, and at least one of b, c and d are at least one, $R^2$ is H or $CH_3$, and $R^3$ is an alkyl group, an aryl group or combination thereof, and each of a*, b*, c* and d* represent the fraction of the a, b, c and d monomer units substituted by the pendent succinyl group.

5. The adhesive composition of claim 4 wherein "b" and "c" or "d" are chosen such that the copolymer comprises 1 to 20 wt. % of the respective monomer units.

6. The adhesive composition of claim 5 wherein b*+c*+d* is 1 to 5 wt. %.

7. The adhesive of claim 1 wherein the polyamine photobase generator is a benzyl carbamate, a formal, an oxime ester, a benzoin carbamate, an o-carbamoylhydroxyamine, an O-carbamoyloxime, an aromatic sulfonamide, an alpha-lactam, an N-(2-allylethenyl)amide, an arylazide, an N-arylformamide, or an 4-(ortho-nitrophenyl)dihydropyridine, of a polyamine.

8. The adhesive composition of claim 1 wherein the polyamines have at least two primary or secondary amino groups.

9. The adhesive composition of claim 1 wherein the isobutylene copolymer having pendent anhydride groups represented by the generalized formula:

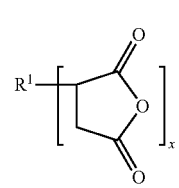

I wherein
$R^1$ represents the polymeric isobutylene having at least 20 repeat units and subscript x represents a fraction of those repeat units substituted by the cyclic anhydride.

10. The adhesive composition of claim 9 wherein 1 to 5 percent of the repeat units of the isobutylene copolymer will be substituted by cyclic anhydride groups.

11. The crosslinked adhesive composition of claim 1.

12. The crosslinked adhesive of claim 11 further comprising the residue of the photobase generator.

13. The adhesive of claim 1 wherein said isobutylene copolymer having pendent anhydride groups is prepared by free-radical addition of maleic anhydride to a polyisobutylene.

14. An article comprising:
a substrate; and
the adhesive of claim 1 coated on at least one surface of the substrate.

15. The adhesive of claim 1 wherein the tackifier is a hydrogenated $C_9$ petroleum resin.

* * * * *